(12) United States Patent
Divers

(10) Patent No.: US 7,182,353 B2
(45) Date of Patent: Feb. 27, 2007

(54) TURN BRAKE FOR MULTI-TRACK VEHICLES

(75) Inventor: Ross Divers, Lake Oswego, OR (US)

(73) Assignee: Divers Contracting Services, Inc., Lake Oswego, OR (US)

( * ) Notice: Subject to any disclaimer, the term of this patent is extended or adjusted under 35 U.S.C. 154(b) by 446 days.

(21) Appl. No.: 10/305,799

(22) Filed: Nov. 26, 2002

(65) Prior Publication Data

US 2003/0132075 A1   Jul. 17, 2003

Related U.S. Application Data

(60) Provisional application No. 60/350,320, filed on Jan. 17, 2002, provisional application No. 60/412,386, filed on Sep. 20, 2002.

(51) Int. Cl.
 *B62D 11/08* (2006.01)
 *B60T 11/21* (2006.01)

(52) U.S. Cl. .................. 280/88; 188/345; 188/350

(58) Field of Classification Search ............ 180/6.3, 180/6.24, 6.2, 437; 280/89.11, 93.508, 88; 303/6.01; 301/6.01; 188/350, 345, 152, 188/151
See application file for complete search history.

(56) References Cited

U.S. PATENT DOCUMENTS

| | | | |
|---|---|---|---|
| 1,175,917 A | 3/1916 | Arnoldi | |
| 2,209,149 A * | 7/1940 | Briand | 188/350 |
| 2,254,902 A | 9/1941 | Milster | 180/6.3 |
| 2,360,843 A | 10/1944 | Boldt | 180/18 |
| 2,366,207 A | 1/1945 | Milster | 180/18 |
| 2,442,601 A | 6/1948 | House et al. | 180/18 |
| 2,474,961 A | 7/1949 | Sneed | 180/18 |
| 3,129,035 A | 4/1964 | Alfieri | 303/9.61 |
| 3,603,424 A | 9/1971 | Blood et al. | 180/79.2 B |
| 3,877,537 A | 4/1975 | Ohms et al. | 180/6.3 |
| 3,888,328 A * | 6/1975 | Lieber | 180/437 |
| 3,893,528 A | 7/1975 | Rehfeld | 180/6.3 |
| 4,030,771 A * | 6/1977 | Young | 280/88 |
| 4,088,209 A * | 5/1978 | Drone | 192/13 R |

(Continued)

FOREIGN PATENT DOCUMENTS

JP   60206786 A  * 10/1985

(Continued)

OTHER PUBLICATIONS

Albert Beasley, Jr., Fluid Power, United States Navy, Naval Education and Training Professional Development and Technology Center, Jul. 1990, pp. i-iii, 6-1 and 6-18.

*Primary Examiner*—Lesley D. Morris
*Assistant Examiner*—Daniel Yeagley
(74) *Attorney, Agent, or Firm*—Stoel Rives LLP

(57) ABSTRACT

A turn brake includes a cylinder assembly coupled to a conventional front-wheel steering system of a multi-track vehicle. The cylinder assembly generates fluid power for applying differential braking force to left and right wheels of the vehicle in response to turning of a steering wheel of the steering system, thereby compensating for a loss of steering traction. Pressure generated in the cylinder assembly can exert a reaction force on the steering wheel to provide tactile feedback to the driver, which may help to avoid oversteer. An optional shutoff mechanism may be provided for selectively disabling or disconnecting the turn brake.

50 Claims, 7 Drawing Sheets

U.S. PATENT DOCUMENTS

| | | | | |
|---|---|---|---|---|
| 4,137,944 A | * | 2/1979 | Koch | 137/596 |
| 4,140,201 A | * | 2/1979 | Young | 180/313 |
| 4,201,272 A | * | 5/1980 | Midolo | 180/6.48 |
| 4,336,953 A | * | 6/1982 | Low | 280/93.508 |
| 4,418,931 A | * | 12/1983 | Howard | 280/89.11 |
| 4,494,621 A | * | 1/1985 | Nagata | 180/6.2 |
| 4,538,641 A | * | 9/1985 | Chatterjea | 137/596.1 |
| 5,022,477 A | | 6/1991 | Wanie | 180/6.34 |
| 6,017,101 A | | 1/2000 | Matsuda | 303/140 |
| 6,059,383 A | | 5/2000 | Paggi et al. | 303/190 |
| 6,216,806 B1 | * | 4/2001 | Toms | 180/6.2 |
| 6,267,395 B1 | * | 7/2001 | Howard | 280/89.11 |
| 6,527,070 B2 | * | 3/2003 | Ryan | 180/6.7 |

FOREIGN PATENT DOCUMENTS

RU      1813669      5/1993

* cited by examiner

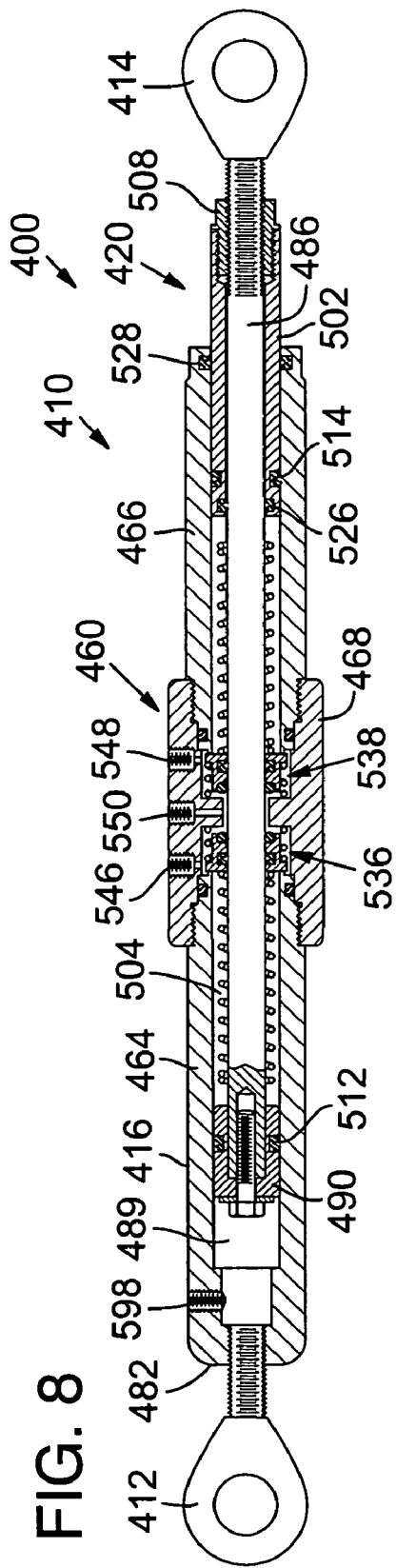
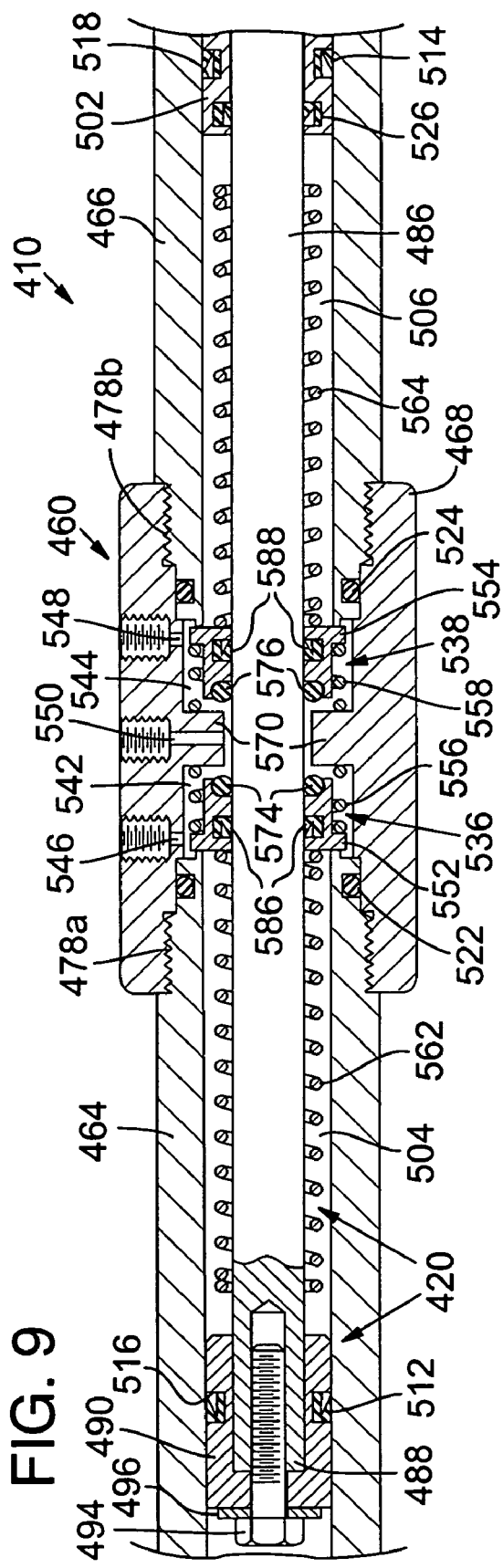

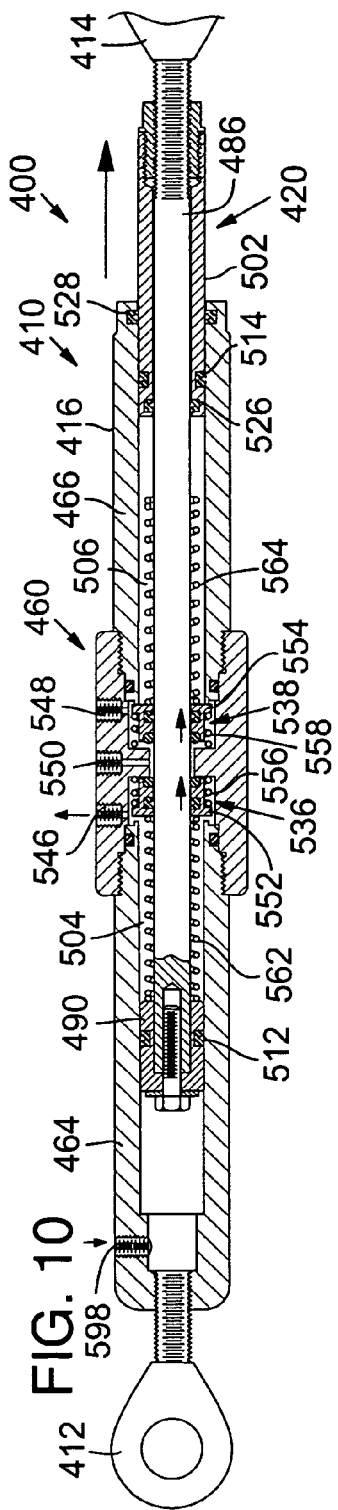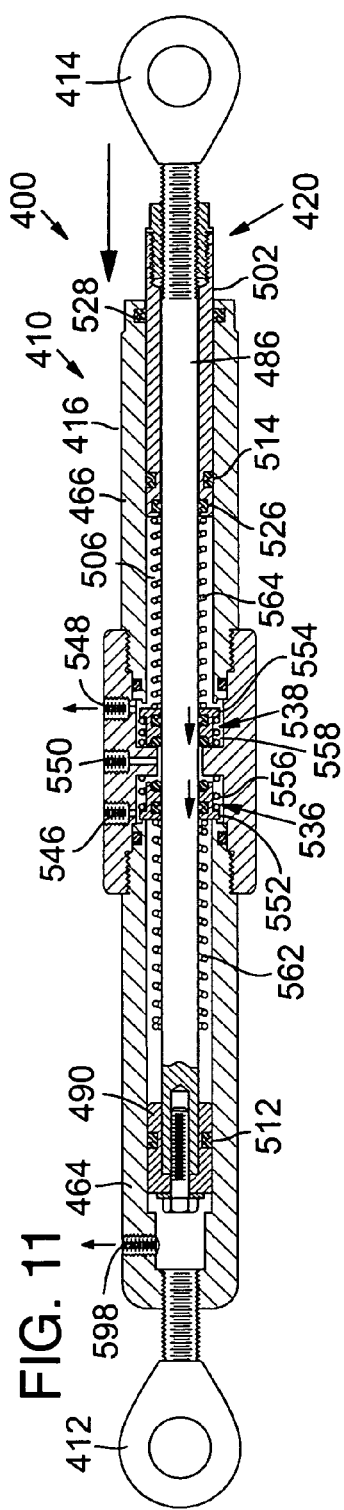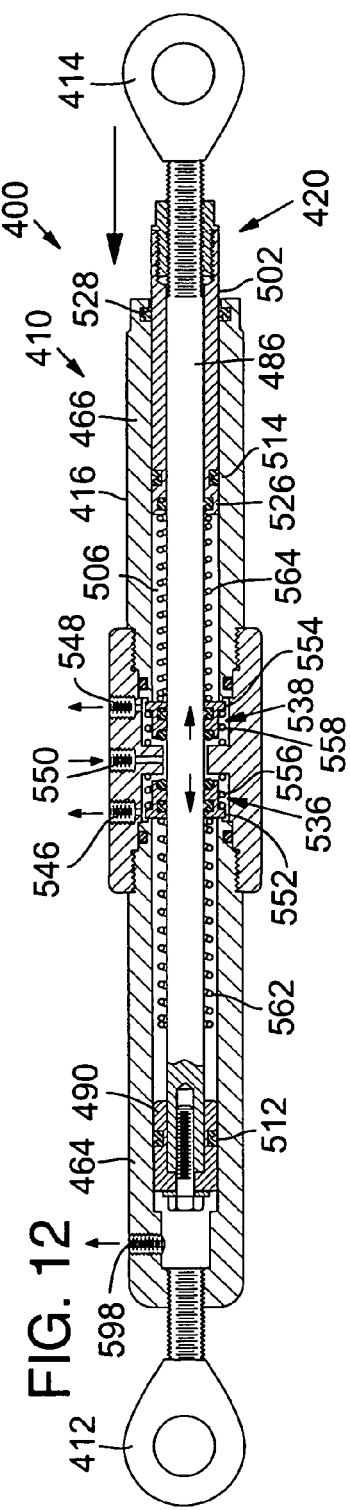

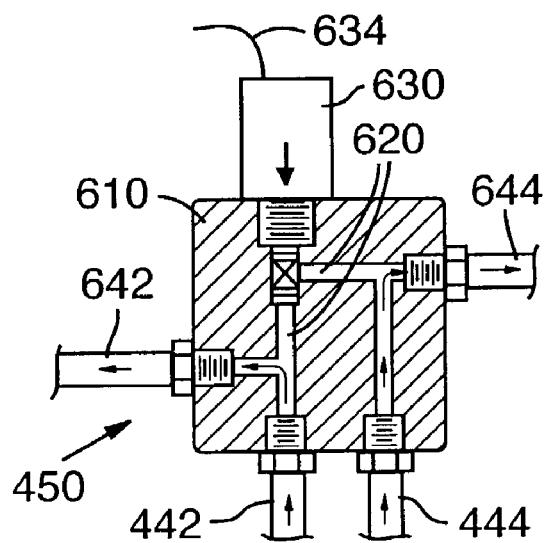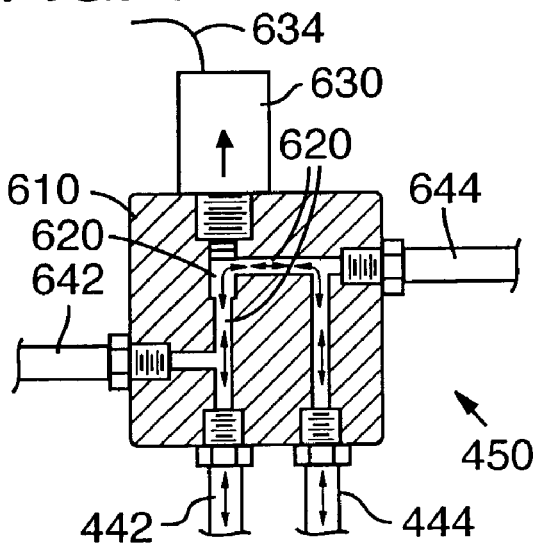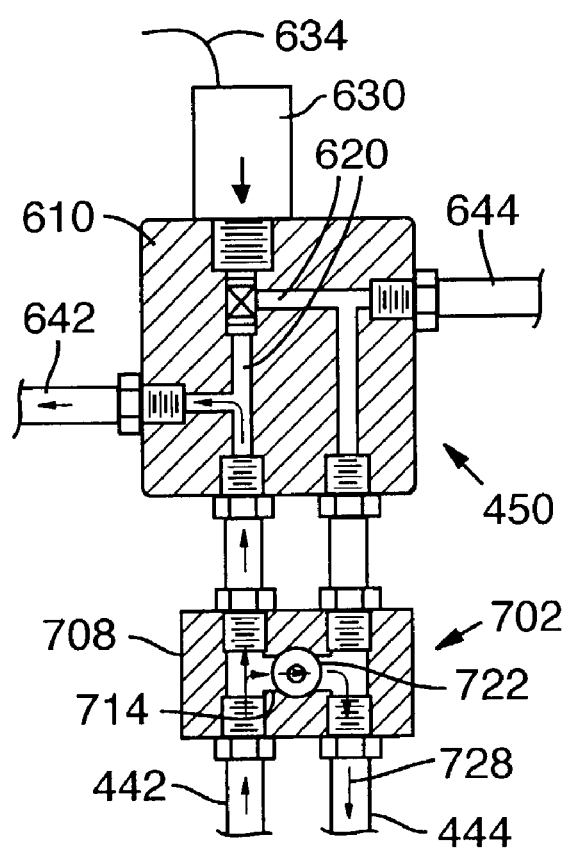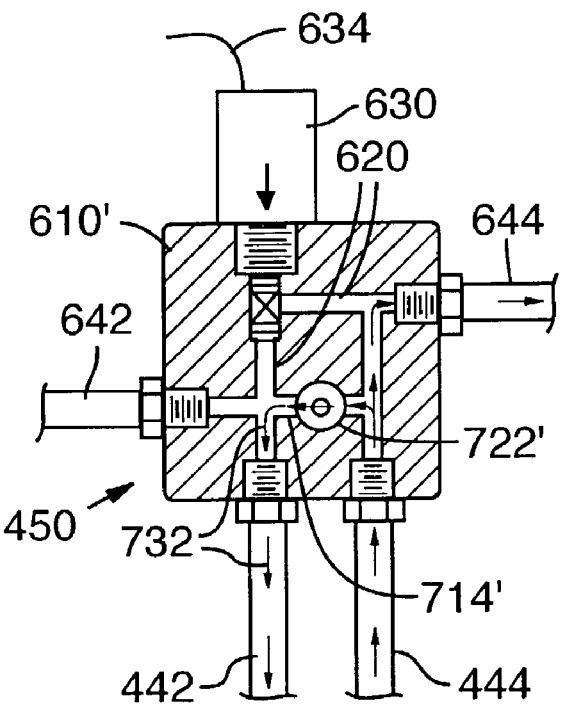

TURN BRAKE FOR MULTI-TRACK VEHICLES

RELATED APPLICATIONS

This application claims the benefit under 35 U.S.C. § 119 of U.S. Provisional Application Nos. 60/350,320, filed Jan. 17, 2002, and 60/412,386, filed Sep. 20, 2002, which are incorporated herein by reference.

TECHNICAL FIELD

The present invention relates generally to a steering mechanism for multi-track vehicles and, in particular, to a turn brake mechanism for off-road vehicles such as dune buggies that is activated by turning the vehicle's steering wheel.

BACKGROUND OF THE INVENTION

Multi-track off-road vehicles such as dune buggies (also known as sandrail vehicles) and smaller all-terrain vehicles (ATVs) having more than one wheel track are subject to loss of steering traction when driving over loose terrain such as sand or loose soil. Steering traction may be further compromised when driving at high speeds or when accelerating. Dune buggies are especially prone to loss of steering traction because they typically have very little weight supported by their front wheels and their front ends tend to lift when accelerating. Loss of steering traction can result in substantial understeer or, in severe cases, a total loss of steering, thereby decreasing maneuverability and increasing the risk of accidents. To compensate for loss of steering traction, some dune buggies have lever-operated turn brakes that allow the driver to turn the dune buggy by manually applying differential braking force to the rear wheels.

FIG. 1 shows a hydraulic cylinder assembly 10 used in prior-art lever-operated turn brakes. With reference to FIG. 1, a pair of hydraulic cylinders 11, 12 are spaced apart within a housing 13 that includes mounting tabs 14 for attaching the hydraulic cylinder assembly 10 to a frame of a dune buggy (not shown). A first hydraulic line 15 couples the first cylinder 11 to the braking mechanism of the dune buggy's right rear wheel (not shown), while a second hydraulic line 16 couples the second cylinder 12 to the left rear wheel (not shown). A hydraulic input line 17 supplies hydraulic brake fluid from a foot-brake master cylinder reservoir (not shown) to the cylinders 11, 12. A rocker lever 18 having a handle 19 is coupled to the cylinders 11, 12 and pivots about a pivot point 20 located medially of the cylinders so that moving the handle 19 selectively applies pressure to one cylinder while releasing pressure on the other cylinder. In this manner, the dune buggy can be steered over loose terrain merely by manually moving the rocker lever 18. The hydraulic cylinder assembly 10 would typically be located adjacent the driver's seat of the dune buggy, within the driver's reach, typically near the transmission shift lever. A pedal-operated hydraulic main brake typically operates in conjunction with the turn brake system for stopping the dune buggy.

Independently operated pedal brakes having two pedals, one for each of the left and right brakes, are also known for use in tractors to improve maneuverability, as described, for example, in U.S. Pat. No. 5,022,477 of Wanie.

Both of these prior-art systems require the driver to provide manual inputs different from the familiar motions used in driving an automobile. Lever-operated turn brakes require the user to take one hand off the steering wheel and reach for a lever at a time when he or she may have an increased need to keep both hands on the steering wheel for maneuvering purposes. The driver may also need to look away from the direction in which he or she is driving in order to find the handle of the turn brake. Similar problems can arise with pedal-operated turn brakes, which require at least one foot to operate.

Many other known systems for differential braking include a distributor valve or a pair of valves that are mechanically coupled to the steering wheel for releasing compressed air or hydraulic fluid to the left and right wheel brakes selectively, in response to turning of the steering wheel, as described in U.S. Pat. Nos. 2,254,902 and 2,366,207 of Milster, U.S. Pat. No. 2,360,843 of Boldt, U.S. Pat. No. 2,442,601 of House et al., U.S. Pat. No. 2,474,961 of Sneed, U.S. Pat. No. 3,129,035 of Alfieri, U.S. Pat. No. 3,603,424 of Blood et al., and U.S. Pat. No. 3,877,537 of Ohms et al. These valve-actuated systems require a source of pressurized operating fluid, such as pumped hydraulic fluid or compressed air. In the systems described in U.S. Pat. Nos. 2,254,902, 2,366,207, 2,442,601, and 2,474,961, the fluid pressure is generated by pumping a foot brake pedal at the same time as the valves are actuated via the steering wheel. In the systems of U.S. Pat. Nos. 2,360,843, 3,129,035, 3,603,424, and 3,877,537, fluid pressure is generated by a powered compressor or hydraulic pump. Both types of systems require braking force to be generated by a source other than the torque being applied to the steering wheel.

U.S. Pat. No. 3,893,528 of Rehfeld describes a system for temporarily applying differential braking force to the front wheels of an automobile that includes a hydraulic piston assembly integrated with the steering column of a power-assisted steering system. Differential braking force is generated by a piston that is driven linearly only when steering torque exceeds a predetermined threshold, e.g., in response to a loss of hydraulic pressure in the power-assisted steering system or when turning sharply in an emergency maneuver. Because steering torque does not exceed the threshold during normal steering maneuvers and because the differential braking force is applied only to the front wheels, the system of Rehfeld would be inoperable in the event of a loss of front-wheel traction, for example when driving over loose soil or sand.

The inventor has recognized a need for an improved supplemental steering system for a multi-track vehicle that generates differential braking force in response to turning of the vehicle's steering wheel and that can compensate for a loss of front-wheel steering traction.

SUMMARY OF THE INVENTION

In accordance with the present invention, a turn brake for a multi-track vehicle includes a turn brake cylinder assembly coupled to a conventional front-wheel steering system of the vehicle. The cylinder assembly is preferably coupled to a steering rod of the steering system by a mechanical linkage that actuates a piston assembly of the turn brake in response to turning of a steering wheel of the steering system. The turn brake cylinder assembly includes first and second cylinder cavities in fluid communication with respective left and right wheel brakes of the vehicle. In response to turning of the steering wheel, the piston assembly is driven to generate fluid pressure in one of the cylinder cavities, thereby causing differential braking force to be applied to the left and right wheel brakes. The system is preferably configured so that the fluid pressure generated by the turn brake exerts a reaction force on the steering mechanism that provides tactile feedback to the driver, which can help to avoid oversteer. An optional shutoff mechanism may be provided for selectively disabling or disconnecting the turn brake when it is desirable to steer the vehicle with only the conventional front-wheel steering system and without the turn brake, for example, when driving on pavement.

Additional aspects and advantages of this invention will be apparent from the following detailed description of preferred embodiments, which proceeds with reference to the accompanying drawings.

BRIEF DESCRIPTION OF THE DRAWINGS

FIG. 6 is a partially cross-sectional top plan view of a third preferred embodiment turn brake system having a pair of turn brake cylinders that share a single cylinder housing;

FIG. 8 is a cross-sectional view of the turn brake system of FIG. 7, shown in a neutral, centered position;

FIG. 9 is an enlarged cross-sectional view of the valve body and piston assembly portions of the turn brake system of FIG. 8;

FIG. 10 is a cross-sectional view of the turn brake system of FIG. 8, shown with its piston assembly extended from its cylinder housing to apply braking force to a first wheel of the vehicle;

FIG. 11 is a cross-sectional view of the turn brake system of FIG. 8, shown with its piston assembly depressed into the cylinder housing to apply braking force to a second wheel of the vehicle;

FIG. 12 is a cross-sectional view of the turn brake system of FIG. 11, showing the turn brake being overridden by fluid pressure generated by application of the vehicle's foot brake;

FIG. 13 is a cross-sectional view of a flow-diverting control valve for disabling the turn brake system of FIG. 7, shown with the turn brake system enabled; and FIG. 14 is a cross-sectional view of the control valve of FIG. 13, shown with the control valve in the shutoff position to disable the turn brake system;

FIG. 15 is a cross-sectional view of the control valve of FIG. 13, together with an optional pressure relief valve for regulating turn braking force, shown with a schematic illustration of brake fluid flow during a left turn maneuver; and FIG. 16 is a cross sectional view of an alternative control valve and an integrated pressure relief valve, with a schematic illustration of brake fluid flow during a right turn maneuver.

DETAILED DESCRIPTION OF PREFERRED EMBODIMENTS

Figure 1:
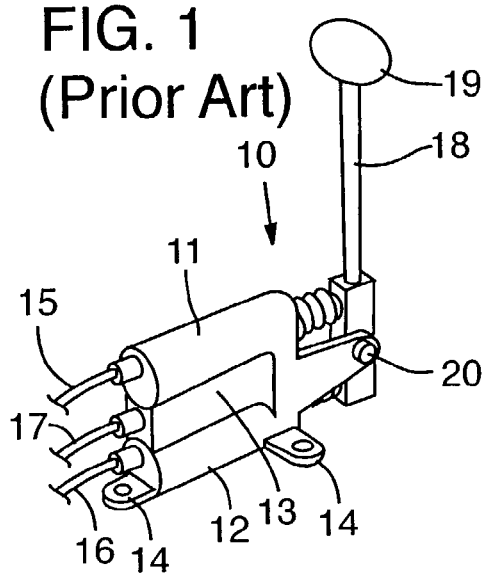
FIG. 1 is a prior-art hydraulic cylinder assembly.
Figure 2:
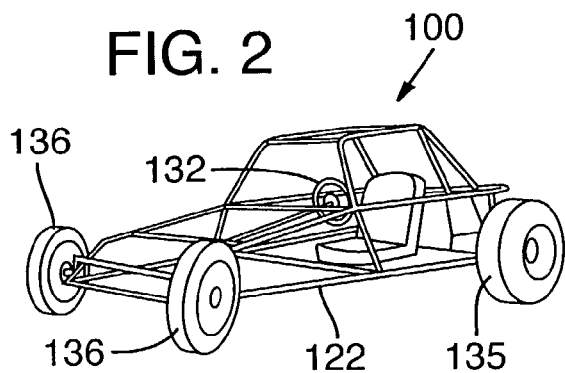
FIG. 2 is a pictorial view of an off-road vehicle including a turn brake system in accordance with a first preferred embodiment.
Figure 3:
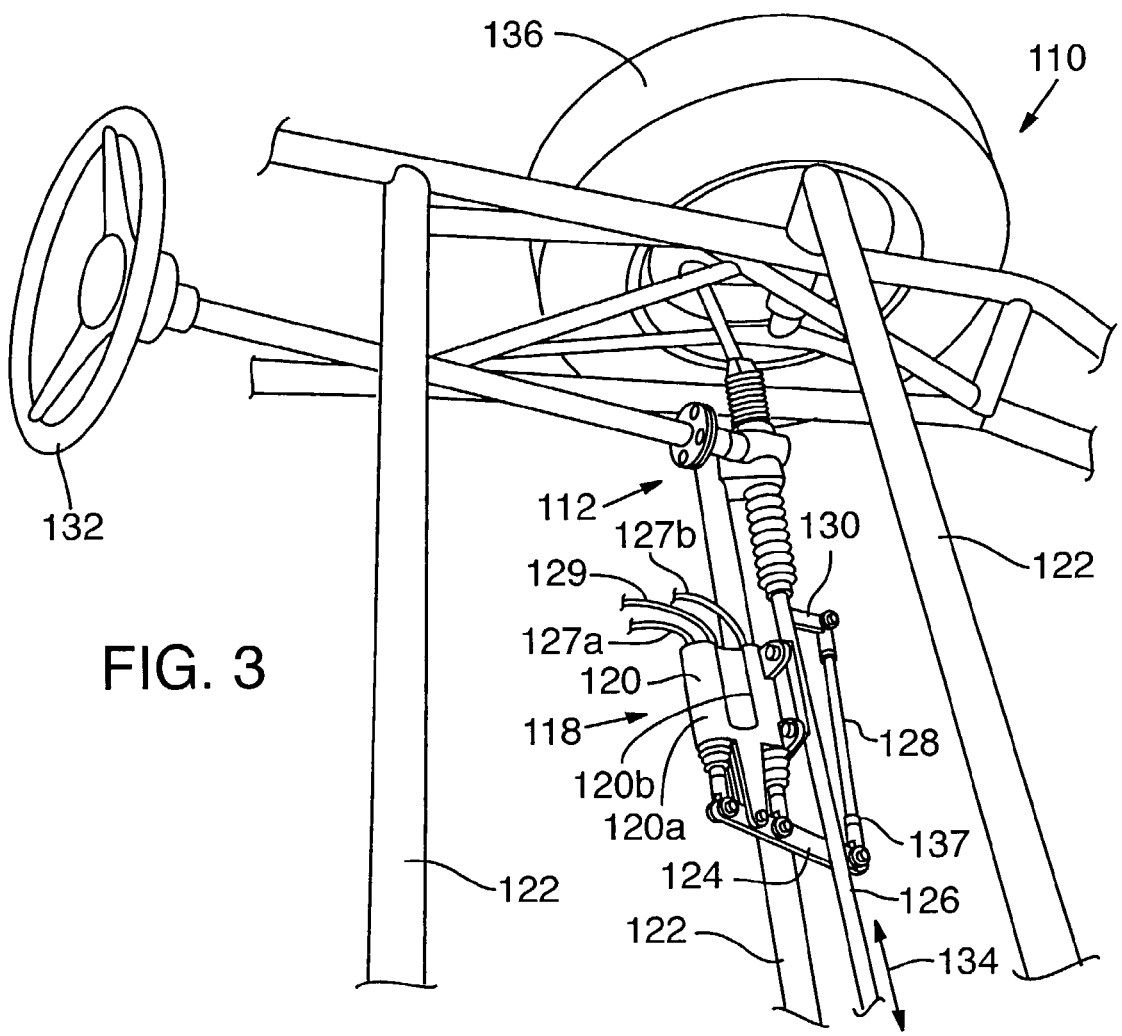
FIG. 3 is an enlarged partial pictorial view of the front left quarter of the off-road vehicle of FIG. 2, showing detail of the turn brake system and a conventional front-wheel steering system.

FIG. 2 is a pictorial view of an off-road vehicle 100. FIG. 3 is an enlarged partial pictorial view of a front left quarter section 110 of vehicle 100, showing detail of its rack-and-pinion type front wheel steering mechanism 112 and a turn brake system 118 in accordance with a first preferred embodiment. With reference to FIGS. 2 and 3, a modified dual brake cylinder assembly 120 of the type described above in reference to FIG. 1 is rigidly mounted to a frame 122 of vehicle 100 so that a rocker lever 124 of brake cylinder assembly 120 is oriented generally transversely of a steering rod 126 of front wheel steering mechanism 112. Cylinder assembly 120 includes first and second cylinders 120a and 120b in communication with respective left and right rear wheel brakes (not shown) via respective first and second hydraulic lines 127a and 127b. A brake fluid inlet line 129 supplies brake fluid to cylinders 120a and 120b from an output of a foot brake master cylinder (not shown) of vehicle 100. An adjustable-length linkage 128 connects rocker lever 124 to a tab 130, which is securely welded or clamped onto steering rod 126. When the driver turns a steering wheel 132 of front wheel steering mechanism 112, lateral motion of steering rod 126 in the direction shown by arrows 134 actuates rocker lever 124 of turn brake system 118, thereby applying differential braking force to rear wheels 135 of vehicle 100 concurrently with steering of front wheels 136 of vehicle 100.

Advantageously, turn brake system 118 provides tactile feedback to a driver of vehicle 100 through steering wheel 132, via an opposing force generated hydraulically by cylinder assembly 120. For example, the more that steering wheel 132 is turned, the greater the resistance from turn brake system 118. Thus, turn brake system 118 can provide the driver with the sensation of steering traction even though front wheels 136 may not have sufficient traction to steer vehicle 100. The opposing force also avoids inadvertent oversteer by providing a tactile cue to the driver.

To facilitate installation and maintenance of turn brake system 118, cylinder assembly 120 and rocker lever 124 can be "centered" with respect to front wheel steering mechanism 112 by adjusting the length of linkage 128 via, for example, an adjusting screw 137 of linkage 128. By adjusting the length of linkage 128, turn brake system 118 can be set so that no braking force is applied to either of rear wheels 135 when steering wheel 132 is turned to a center position in which front wheels 136 are pointed straight ahead.

Figure 4:
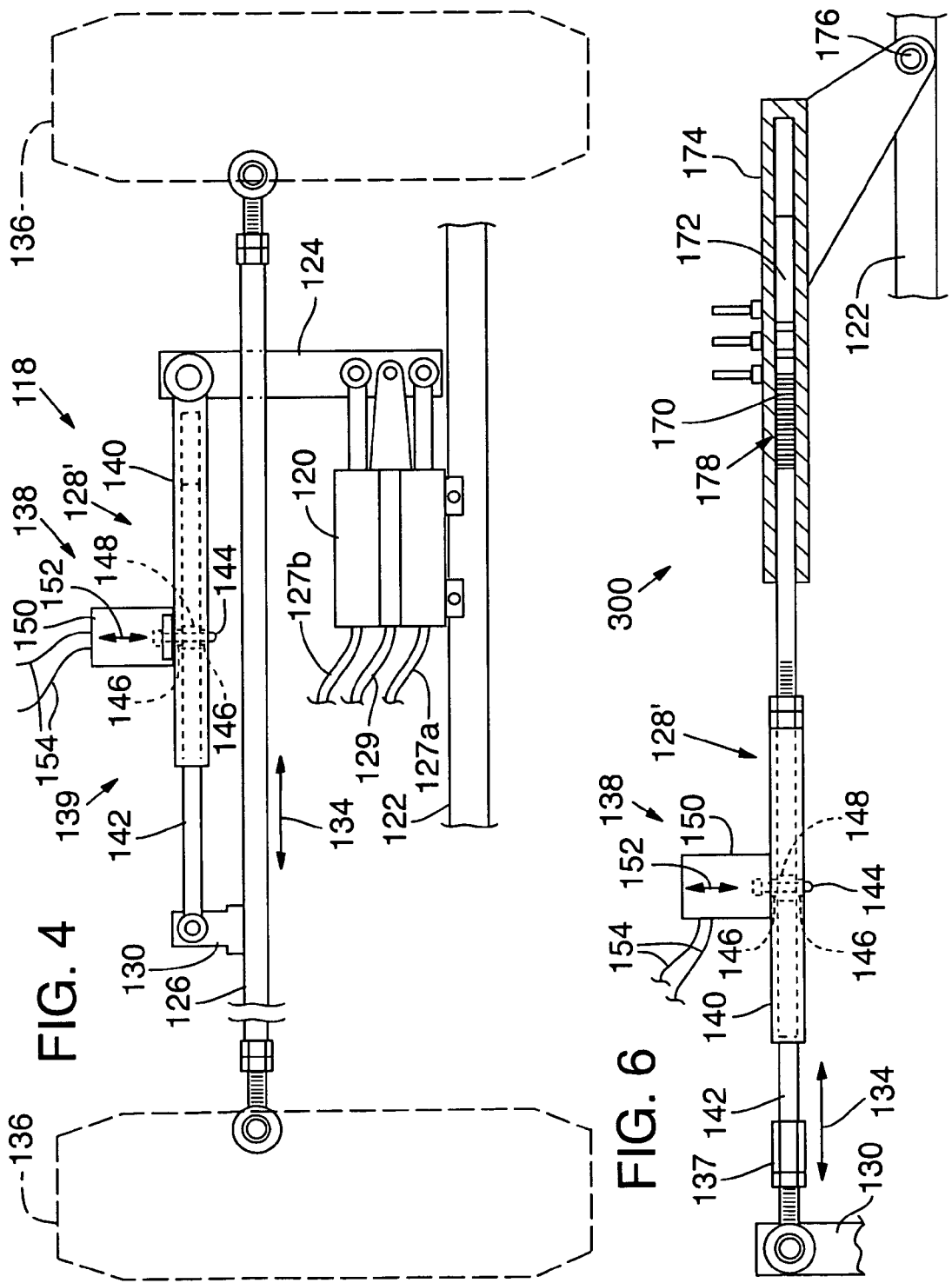
FIG. 4 is a fragmentary top plan view of the vehicle of FIG. 3, showing a mechanical decoupling mechanism for selectively shutting off the turn brake system.

To reduce tire wear, an optional shutoff device may be used to selectively disable or disarm turn brake system 118 when it is not needed or desired, such as when driving the vehicle over hard road surfaces. An embodiment of such an optional shutoff device 138 is shown in FIG. 4, which is a fragmentary top plan view of the vehicle of FIG. 3. With reference to FIG. 4, shutoff device 138 includes a modified linkage 128' (replacing linkage 128 of FIG. 3) with a selectively releasable coupling 139 having a sleeve portion 140 and a rod portion 142. A pin 144 extends through a first transverse hole 146 in sleeve portion 140 and a second transverse hole 148 in rod portion 142 to couple sleeve portion 140 to rod portion 142 when turn brake system 118 is in its normal activated condition. An actuator 150, such as a solenoid, is coupled to pin 144 and moves pin 144 in the direction shown by arrow 152. Pin 144 is retracted from second transverse hole 148 to decouple the sleeve and rod portions 140 and 142 of linkage 128' so that rod portion 142 will slide freely within sleeve portion 140, thereby deactivating turn brake system 118. Actuator 150 can be selectively operated by a manual electric switch (not shown) mounted on an instrument panel of vehicle 100 and connected to actuator 150 by electrical wires 154 or by any other convenient means. Turn brake system 118 is reactivated by reversing actuator 150 to force pin 144 toward linkage 128' and then turning steering wheel 132 until pin 144 reengages first and second transverse holes 146, 148.

Figure 5:
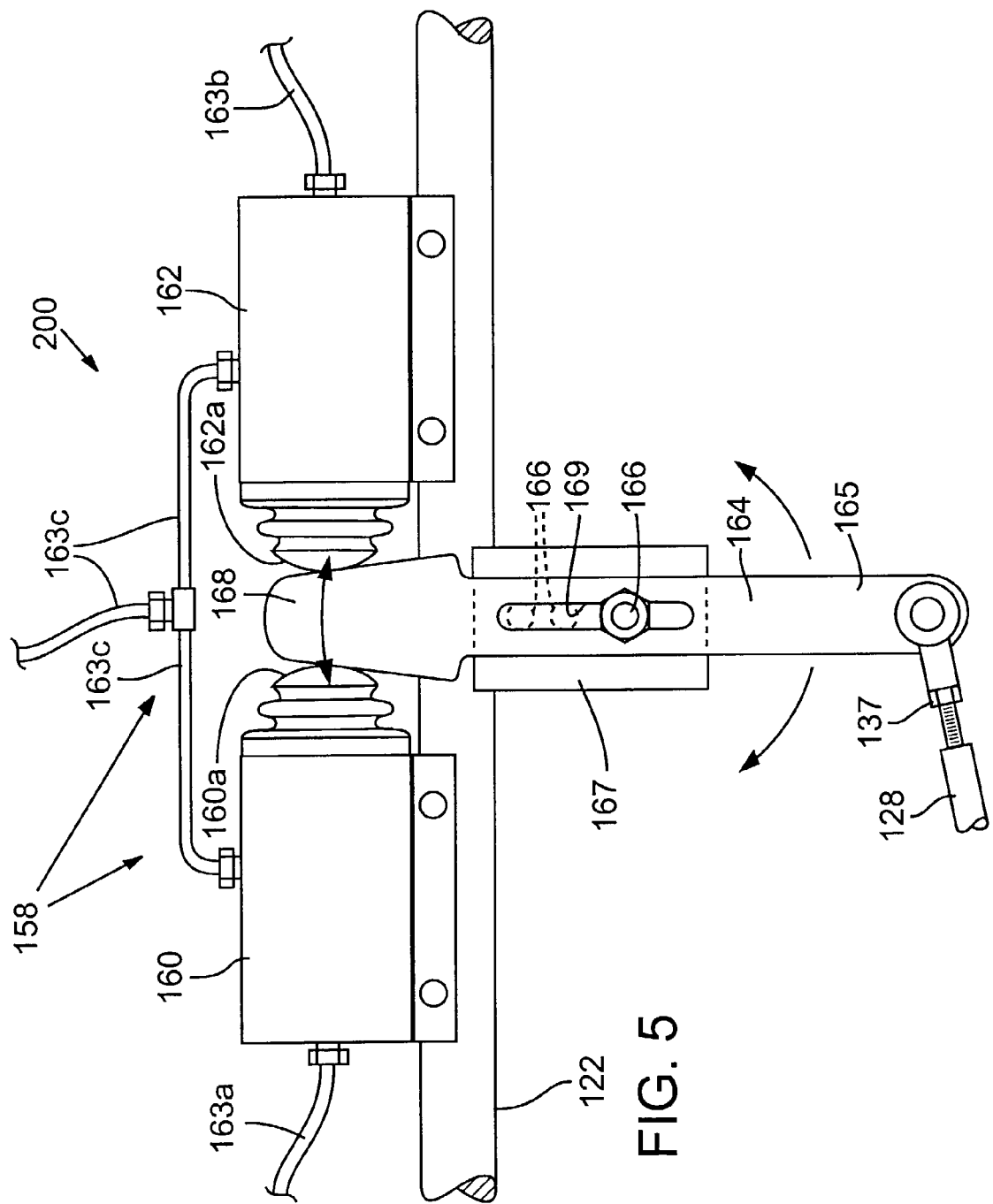
FIG. 5 is a top plan view of a second preferred embodiment turn brake system having a pair of spaced-apart cylinders in opposing alignment.

FIG. 5 shows a second preferred embodiment turn brake system 200, including a cylinder assembly 158 comprising a pair of spaced-apart opposing cylinders 160,162 operably coupled to respective left and right wheel brakes (not shown) via first and second fluid lines 163a and 163b. Brake fluid is supplied to cylinders 160,162 via inlet lines 163c, which are in fluid communication with the output of the foot brake master cylinder of the vehicle (not shown). A rocker shoe 164 is coupled at a first end 165 to front wheel steering mechanism 112 (FIG. 3) via linkage 128. A threaded adjusting screw 137 or nut can be turned to adjust the length of linkage 128 and thereby align turn brake system 200 with the vehicle's steering system, as in first preferred embodiment turn brake system 118 (FIG. 3). Rocker shoe 164 pivots about an adjustable pivot point 166, which may consist of a bolt-and-nut assembly. Pivot point 166 is movable along a mounting plate 167 and within a slot 169 of rocker shoe 164 to adjust the sensitivity of turn brake system 200. A free end 168 of rocker shoe 164 extends between piston ends 160a and 162a of cylinders 160,162 to actuate cylinders 160, 162 differentially, thereby generating differential braking force.

FIG. 6 shows a third preferred embodiment turn brake system 300, having turn brake cylinders 170, 172 that share a single cylinder housing 174, thereby eliminating the need for a rocker lever or rocker shoe. Cylinder housing 174 is pivotably mounted to frame 122 of vehicle 100 (FIG. 2) via a pivot mount 176. A single shuffle-piston assembly 178, including complex valves and springs (not shown), extends through both cylinders 170, 172 and is mechanically coupled to front wheel steering mechanism 112 (FIG. 3) to activate one of cylinders 170, 172 in response to turning of front-wheel steering mechanism 112.

Figure 7:
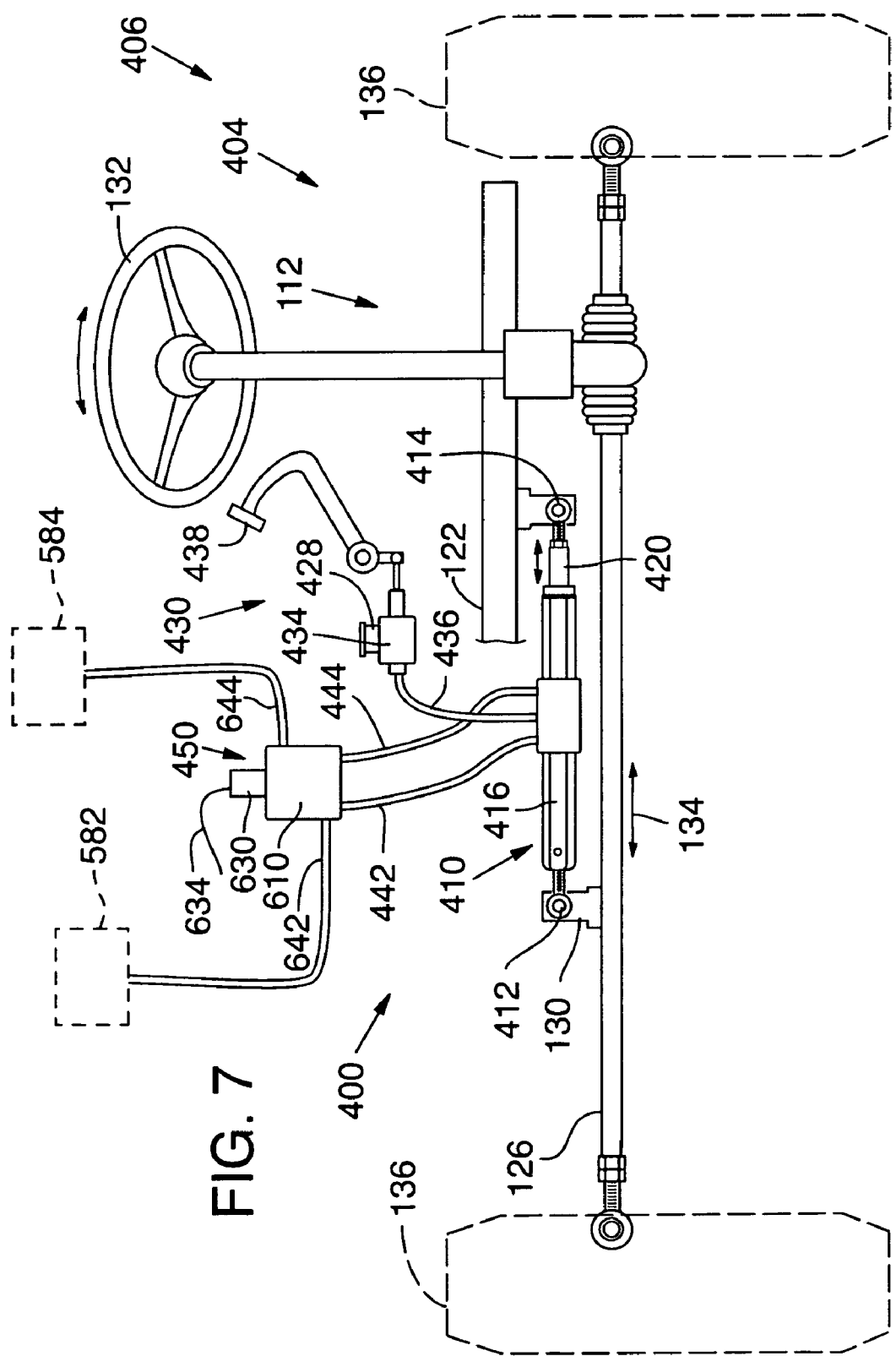
FIG. 7 is a schematic view of a fourth preferred embodiment turn brake system shown with a front wheel steering portion of a multi-track vehicle.

FIG. 7 is a schematic top plan view of a fourth preferred embodiment turn brake system 400 coupled with a front wheel steering portion 404 of a multi-track vehicle 406. With reference to FIG. 7, turn brake system 400 includes an elongate turn brake cylinder assembly 410 having first and second rod ends 412 and 414. First rod end 412 is rigidly attached to a housing 416 of turn brake cylinder assembly 410, and second rod end 414 is secured to a distal end of a movable piston assembly 420 of turn brake cylinder assembly 410. Rod ends 412 and 414 connect turn brake system 400, at one end, to steering rod 126 of front wheel steering mechanism 112 of vehicle 406 and, at the other end, to frame 122 of vehicle 406. Turn brake cylinder assembly 410 is arranged generally in alignment with steering rod 126 so that steering motions transmitted to turn brake system 400 by steering rod 126 in response to rotation of steering wheel 132 cause piston assembly 420 to move relative to cylinder housing 416 (or vice versa) so that torque applied to steering wheel 132 is converted into differential rear-wheel braking force, as described below with reference to FIGS. 8–12.

Brake fluid, which is preferably hydraulic fluid (or, alternatively, any other incompressible or compressible fluid), is supplied to turn brake system 400 from a fluid source, such as a brake fluid reservoir 428 of a foot brake 430 of vehicle 406. In particular, the output of a hydraulic master cylinder 434 of foot brake 430 is preferably connected via a fluid input line 436 to a central inlet port 550 (FIGS. 8 and 9) of turn brake cylinder assembly 410. First and second output lines 442 and 444 of turn brake cylinder assembly 410 deliver brake fluid from turn brake cylinder assembly 410 to respective left and right rear wheel brakes (not shown) of vehicle 406. In some embodiments, brake fluid can flow freely through master cylinder 434 when foot brake 430 is not applied, such that gravity ensures that input line 436, turn brake cylinder assembly 410, and output lines 442 and 444 remain charged with brake fluid, even when foot brake 430 and turn brake system 400 are not activated. In other embodiments, turn brake system 400 is filled with fluid before operation, for example, by pumping master cylinder 434 while bleeding any air that may be trapped in output lines 442 and 444. A flow-diverting control valve 450 is optionally interposed in the fluid communication path between turn brake cylinder assembly 410 and the rear wheel brakes for selectively disabling turn brake system 400 without interfering with the operation of foot brake 430, as further described below with reference to FIGS. 13 and 14.

Those skilled in the art will appreciate that turn brake system 400 could also be used to apply differential brake force to the front wheels 136 of vehicle 406, rather than the rear wheels 135 (FIG. 2), or to both front wheels 136 and rear wheels 135. However, differential braking of front wheels 136 would be of limited utility in an off-road vehicle, because such vehicles are prone to "wheelie" (i.e., lifting of the vehicle's front end off of the ground) or otherwise lose front wheel steering traction during acceleration or travel over uneven terrain. Use of turn brake system 400 to apply differential braking force to the rear wheels 135 allows turning in low traction conditions—even during a complete loss of front wheel steering traction, such as when the vehicle 406 wheelies under high acceleration forces.

Skilled persons will further appreciate that turn brake cylinder assembly 410 can be reversed so that second rod end 414 is connected to steering rod 126 (or any other laterally moving component of front wheel steering mechanism 112) and first rod end 412 is connected to frame 122 (or any other laterally fixed component of vehicle 406). Turn brake system 400 could also be integrated with other components of vehicle 406. For example, cylinder housing 416 could be integrated with a steering rack of the rack-and-pinion of front wheel steering mechanism 112, with piston assembly 420 mechanically coupled to the pinion portion, the steering column, vehicle frame 122, or any other laterally fixed component of vehicle 406. Many other structural and functional changes can be made to the preferred embodiments, while keeping with the spirit of the invention.

For example, in an alternative "drive-by-wire" embodiment (not shown), a turn brake system is operated by a telemetry device including a steering-position sensor that detects movement or position of the steering wheel 132 (or some other component of the front wheel steering mechanism 112). The position sensor outputs one or more signals (e.g., electrical or radio frequency signals) representative of the position or movement of the steering wheel 132, which are received by a motor or actuator that drives the cylinder assembly of the turn brake. To disable the turn brake, the drive-by-wire embodiment may utilize an electronic shutoff that interrupts the sensor output signals, in place of the mechanical shutoff device 138 of FIG. 4 or the flow-diverting control valve 450 of FIG. 7.

FIG. 8 is a cross-sectional view of turn brake cylinder assembly 410, shown in a neutral, centered position. FIG. 9 is an enlarged cross-sectional view of a valve module 460, piston assembly 420, and first and second cylinder bodies 464 and 466 of the turn brake cylinder assembly 410 of FIG.

8. With reference to FIGS. 8 and 9, first and second cylinder bodies 464 and 466 are mounted to opposite ends of a valve body 468 of valve module 460 via threads 478a and 478b. For ease of assembly and maintenance, valve body 468 and cylinder bodies 464 and 466 are preferably separate components, made of a wear-resistant material such as aluminum or steel. However, in an alternative design (not shown), valve body 468, first cylinder body 464, and second cylinder body 466 are formed of unitary one-piece construction. They can also be made of another durable material, such as titanium or impact-resistant plastic, for example.

First rod end 412, which is preferably a male threaded heavy-duty spherical bearing rod end, is threadably mounted to a distal end 482 of first cylinder body 464. A piston rod 486 of piston assembly 420 extends from second rod end 414 through second cylinder body 466, valve body 468, and a portion of first cylinder body 464, to terminate at a proximal end 488 medially of a bore 489 of first cylinder body 464. A first piston sleeve 490 is secured by a bolt 494 and a washer 496, or any other convenient fastening means, to proximal end 488 of piston rod 486 and sized to fit slidably within bore 489. A second piston sleeve 502 is secured to piston rod 486 proximal to second rod end 414 so that at least a portion of second piston sleeve 502 is slidably supported within an inner diameter of second cylinder body 466. In the preferred embodiment, a portion of second piston sleeve 502 extends beyond second cylinder body 466, as shown in FIG. 8. First and second piston sleeves 490 and 502 seal the outer ends of respective first and second cylinder cavities 504 and 506 located within respective first and second cylinder bodies 464 and 466. A sleeve adjusting nut 508 threadably couples second piston sleeve 502 to piston rod 486 and is manually adjustable to vary the position of first and second piston sleeves 490 and 502 relative to first and second cylinder bodies 464 and 466. During installation of turn brake cylinder assembly 410 in vehicle 406, sleeve adjusting nut 508 also facilitates centering of turn brake system 400, and piston assembly 420 in particular, relative to front wheel steering mechanism 112.

For a fluid-tight and pressure-retaining seal of each of cylinder cavities 504 and 506, first and second annular piston seals 512 and 514 are provided in respective first and second outer circumferential grooves 516 and 518 of respective first and second piston sleeves 490 and 502. Piston seals 512 and 514 are preferably lip seals that press firmly against inner walls of respective first and second cylinder bodies 464 and 466 when fluid pressure is present within respective cylinder cavities 504 and 506, but may be any other type of fluid-tight high-pressure seal or packing. To further seal turn brake cylinder assembly 410, additional seals are provided between valve body 468 and first and second cylinder bodies 464 and 466 (cylinder seals 522 and 524), between piston rod 486 and second piston sleeve 502 (rod seal 526), and between second piston sleeve 502 and second cylinder body 466 (an outer sleeve seal 528 (FIG. 8)), which may include O-rings or other types of high-pressure seals.

As mentioned above and as described in greater detail below with reference to FIGS. 10–12, piston assembly 420 cooperates with valve module 460 to effect differential braking and to allow turn brake system 400 to be overridden by foot brake 430 (FIG. 7). With reference to FIG. 9, valve module 460 includes first and second shuttle valve assemblies 536 and 538 positioned within respective first and second valve chambers 542 and 544 of valve body 468. First and second outlet ports 546 and 548, respectively, are drilled transversely through valve body 468 into first and second valve chambers 542 and 544. Shuttle valve assemblies 536 and 538 act as 3-way shuttle valves that share inlet port 550 as one of their inputs. First and second cylinder cavities 504 and 506 are the other inputs to respective first and second shuttle valve assemblies 536 and 538, and first and second outlet ports 546 and 548 are their respective outputs.

First and second shuttle valve assemblies 536 and 538 include first and second valve bushings 552 and 554 that are slidably supported on piston rod 486. First and second valve bushings 552 and 554 are preferably biased in outward directions by preloaded first and second bushing springs 556 and 558, respectively, so that inlet port 550 is normally in fluid communication with first and second outlet ports 546 and 548 when piston assembly 420 is centered in the neutral position, as shown in FIGS. 8 and 9. However, in alternative embodiments (not shown), valve bushings 552 and 554 could be biased inwardly by preloaded bushing springs. First and second bushing springs 556 and 558 are preferably coil springs, but could also include wave springs or any other suitable resilient member or biasing mechanism.

Piston assembly 420 includes first and second piston springs 562 and 564, which are preferably coil springs supported on piston rod 486 and positioned in respective cylinder cavities 504 and 506. Preferably, first piston spring 562 is interposed between first piston sleeve 490 and first valve bushing 552, and second piston spring 564 is interposed between second piston sleeve 502 and second valve bushing 554, although skilled persons appreciating the underlying principles of the invention will understand that a different spring arrangement could be used. Piston springs 562 and 564 are sized so that they are unloaded or only lightly preloaded when turn brake cylinder assembly 410 is in the neutral position. Sleeve adjusting nut 508 is preferably adjusted so that, in the neutral position, the distance between first piston sleeve 490 and first valve bushing 552 is slightly greater than the length of first piston spring 562, and so that the distance between second piston sleeve 502 and second valve bushing 554 is slightly greater than the length of second piston spring 564, thereby allowing a slight amount of free play in turn brake system 400. Free play allows for some movement of piston assembly 420 before piston sleeves 490 and 502 engage respective piston springs 562 and 564, as described below with reference to FIGS. 10 and 11. Free play in turn brake system 400 can allow a driver to make small steering corrections using the front wheel steering system before the more-powerful turn braking forces take effect. The free play also allows for variations in the relative centering of turn brake system 400 and front wheel steering system 112 without requiring readjustment of sleeve adjusting nut 508, for example to accommodate a change in the front wheel alignment of vehicle 406.

FIG. 10 is a cross-sectional view of turn brake cylinder assembly 410 of FIGS. 8 and 9, shown with piston assembly 420 extended from cylinder housing 416 in response to turning of steering wheel 132 (FIG. 7) for a left-turn maneuver. With reference to FIG. 10, first piston sleeve 490 is moved toward valve module 460 so that first piston spring 562 is compressed and engages first valve bushing 552. Spring force generated by compression of first piston spring 562 is sufficient to overcome the preloaded spring force of first bushing spring 556 and drive first valve bushing 552 in the direction shown in order to press a first bushing O-ring 574 (FIG. 9) against a shoulder 570 of valve body 468, thereby sealing first cylinder cavity 504 from inlet port 550. Thereafter, movement of piston assembly 420 in the direction shown generates fluid pressure in first cylinder cavity 504, which is transmitted to left rear wheel brake 582 via first outlet port 546 and first output line 442 (FIG. 7), thereby braking left rear wheel and causing vehicle 406 to turn to the left. A first inner bushing seal 586 (FIG. 9), which is preferably a lip seal, is provided between first valve bushing 552 and piston rod 486 to prevent brake fluid from leaking therebetween.

Similarly, FIG. 11 is a cross-sectional view of turn brake cylinder assembly 410 of FIGS. 8 and 9, shown with piston assembly 420 depressed into cylinder housing 416 in response to turning of steering wheel 132 (FIG. 7) for a right-turn maneuver. With reference to FIG. 11, compression of second piston spring 564 forces second valve bushing 554 and a second bushing o-ring 576 (FIG. 9) against shoulder 570 to seal second cylinder cavity 506. Additional movement of second piston sleeve 502 generates fluid pressure in second cylinder cavity 506, which is transmitted to the right rear wheel brake 584 via second outlet port 548 and second output line 444 (FIG. 7), thereby causing vehicle 406 to turn to the right. A second inner bushing seal 588 (FIG. 9), which is preferably a lip seal, is provided between second valve bushing 554 and piston rod 486 to prevent brake fluid from leaking therebetween.

To avoid creating a vacuum or pressure behind first piston sleeve 49Q, a vent hole 598 is provided in first cylinder body 464 adjacent distal end 482 (FIG. 7). A filter plug (not shown) is preferably threaded into vent hole 598 to prevent road dirt or debris from entering cylinder cavities 504 and 506.

FIG. 12 is a cross-sectional view of turn brake cylinder assembly 410 of FIG. 11, with piston assembly 420 depressed in response to a right-turn maneuver, as described above, and further showing the effect of depressing foot brake 430 (FIG. 7) during a turning maneuver. FIG. 12 depicts a safety feature of the turn brake system 400 that enables it to be used in series with foot brake 430, without impeding the operation of foot brake 430. With reference to FIGS. 7 and 12, upon activation of foot brake 430 by depressing a brake pedal 438 of foot brake pedal 430, fluid pressure is generated by master cylinder 434 and transmitted to valve module 460 via inlet port 550. Fluid pressure at inlet port 550 exerts outwardly directed forces on first and second valve bushings 552 and 554. Since first valve bushing 552 is in the outward position (as in FIG. 11), fluid pressure is transmitted from master cylinder 434 directly to the left rear wheel brake via first outlet port 546. To allow transmission of brake force to the right rear wheel brake via second outlet port 548, second valve bushing 554 must slide outwardly in the direction shown so that inlet port 550 is in fluid communication with second outlet port 548. Second valve bushing 554 slides outwardly when the combined forces on second valve bushing 554 exerted by second bushing spring 558 and the fluid pressure at inlet port 550 exceed the combined forces exerted on second valve bushing 554 by second piston spring 564 and fluid pressure generated in second cylinder cavity 506 by second piston sleeve 502. To the extent that the forces on second valve bushing 554 generated by turn brake system 400 exceed the forces generated by foot brake 430, turn brake system 400 will continue to generate differential braking force and transmit such differential braking forces to the rear wheel brakes. However, when sufficient force is applied to brake pedal 438 of foot brake 430, e.g., the wheel brakes are "locked up," foot brake 430 will override turn brake system 400.

In an alternative embodiment (not shown), first and second piston springs 562 and 564 are omitted and the respective first and second valve bushings 552 and 554 and bushing springs 556 and 558 are modified (not shown) such that valve bushings 552 and 554 are normally biased inwardly to seal against shoulder 570 of valve body 468 when piston assembly 420 is in the centered position. In this alternative embodiment, as in the embodiment of FIGS. 10–12, the movement of piston assembly 420 in response to turning of front wheel steering mechanism 112 generates pressure in the respective first and second cylinder cavities 504 and 506 that is transmitted to the respective left and right rear wheel brakes for turn braking effect. However, because first and second piston springs 562 and 564 are omitted in this alternative embodiment, such movement of piston assembly 420 does not increase the amount of spring force on valve bushings 552 and 554 that must be overcome by fluid pressure at inlet port 550 when activating foot brake 430.

In yet another alternative embodiment (not shown), the piston assembly 420 is modified to comprise a single shared piston interposed between the first and second cylinder cavities. In this alternative, the first and second shuttle valve assemblies 536 and 538 are positioned at the outside ends of the respective first and second cylinder cavities 504 and 506 and the outlet of foot brake master cylinder 434 is coupled to both ends of the turn brake cylinder assembly, adjacent the first and second shuttle valve assemblies and opposite the first and second cylinder cavities, respectively. Central positioning of the shared piston in this embodiment requires switching the output lines 442 and 444 of the turn brake cylinder assembly, so that the first cylinder cavity 504 is operably coupled to the right wheel brake and the second cylinder cavity 506 is operably coupled to the left wheel brake.

FIG. 13 is a cross-sectional view of control valve 450 of FIG. 7. With reference to FIG. 13, control valve 450 includes a manifold 610 to which first and second output lines 442 and 444 deliver brake fluid. Manifold 610 has formed therein a collection of passages including a linking passage 620 that provides a fluid communication pathway between first and second output lines 442 and 444. A cartridge solenoid valve 630 is mounted to manifold 610 to selectively open and close linking passage 620 in response to electrical signals received on a signal wire 634, for example, via a manual switch mounted on an instrument panel (not shown) of vehicle 406. In FIG. 13, solenoid valve 630 is in the "enabled" position, with linking passage 620 closed so that fluid pressure generated in first and second cylinder cavities 504 and 506 of turn brake cylinder assembly 410 is transmitted to respective left and right rear wheels via respective first and second manifold outlets 642 and 644 as indicated by the flow arrows in FIG. 13.

FIG. 14 is a cross-sectional view of control valve 450 of FIG. 13, shown with solenoid valve 630 in the "disabled" position, thereby opening linking passage 620. As shown by the flow arrows in FIG. 14, in the disabled position, braking pressure generated in one of first and second cylinder cavities 504 and 506 of turn brake cylinder assembly 410 (due to contraction of that cavity) is short-circuited and flows back into the other of first and second cylinder cavities 504 and 506, which is simultaneously expanding. Although not depicted in FIG. 14, foot brake 430 will continue to operate properly in the disabled position, since activation of foot brake 430 simultaneously directs brake fluid to first and second output lines 442 and 444 with equal pressure in each of the lines.

FIG. 15 is another cross-sectional view of control valve 450 of FIG. 13, shown with solenoid valve 630 in the enabled position, together with an optional pressure relief module 702 for regulating the amount of turn-braking pressure applied to the wheel brakes. With reference to FIG. 15, pressure relief module 702 is preferably interposed between turn brake cylinder assembly 410 (FIG. 7) and control valve 450 so that first and second output lines 442 and 444 pass through a pressure relief manifold 708 of pressure relief module 702. A pressure linking relief passage 714 extends through pressure relief manifold 708 between first and second output lines 442 and 444 where a cartridge-type pressure relief valve 722 is interposed. Pressure relief valve 722 operates to prevent excessive pressure from being applied by turn brake cylinder assembly 410 during a turning maneuver. In the example depicted in FIG. 15, the turn braking pressure is applied to the left wheel brake via first output line 442 and first manifold output line 642. At low applied pressures (light turn braking forces), all of the fluid pressure will be transmitted to the wheel brakes. As illustrated in FIG. 15, when the turn braking pressure (in this case, in first output line 442) exceeds a predetermined activation pressure of pressure relief valve 722, any excess pressure bleeds through pressure relief valve 722 and is, preferably returned to turn brake cylinder assembly 410 via the non-active side of turn braking system 400. In the case of a left turn maneuver, excess pressure returns to second cylinder cavity 506 via second output line 444, as depicted by arrows 728 in FIG. 15. Thus, the wheel brakes may be allowed to slip during even a sharp turn braking maneuver, in response to simultaneously depressing the accelerator pedal. By regulating the turn braking pressure applied to the left and right wheel brakes, respectively, pressure relief module 702 can prevent damage to a transmission of vehicle 406 that might otherwise result from repeated simultaneous application of engine forces and braking resistance.

Pressure relief valve 722 may be adjustable so that the pressure relief setting can be customized for the particular engine and power transmission capabilities of the particular vehicle in which turn braking system 400 is installed. The pressure relief setting may also be selected by the driver to set the intensity of turn braking force that will be transmitted from turn braking system 400 to the wheel brakes, for example, light, medium, and heavy turn brake settings. Pressure relief valve 722 is preferably a 2-way cartridge-type valve with a 1:1 ratio, but may also include any other type of pressure relieving device that allows flow of fluid when an input pressure exceeds a predetermined activation pressure. The excess fluid pressure is preferably returned to the non-pressurized side of turn brake cylinder assembly 410, as indicated by a return fluid arrow 728 in FIG. 15. However, in an alternative embodiment (not shown), excess pressure may be dumped directly from pressure relief valve 722 into brake fluid reservoir 428 (FIG. 7) via a separate return line (not shown). Pressure relief valve 722 is also preferably a 2-way device that also operates to relieve excess pressure in second output line 444 during a right turn braking maneuver (FIG. 16). However, pressure relief module 702 may alternatively include two separate 1-way pressure relief valves (e.g. spring loaded check valves) and two linking relief passages operating in parallel (not shown).

Moreover, the pressure relief module 702 may be integrated with control valve 450 so that control valve manifold 610 and pressure relief module manifold 708 are formed of unitary one-piece manifold construction 610', as shown in FIG. 16. With reference to FIG. 16, a linking relief passage 714' is drilled in manifold 610' (as an extension of the first manifold outlet path 642. Linking relief passage 714' provides a passageway for fluid communication between first and second output lines 442 and 444, which is restricted by a 2-way pressure relief valve 722' installed in linking relief passage 714'. As in the embodiment of FIG. 15, the pressure relief valve 722' of FIG. 16 allows the passage of fluid through linking relief passage 714' only when the fluid pressure differential exceeds a predetermined activation pressure. FIG. 16 illustrates the application of a right turn braking force via hydraulic pressure in second output line 444, with excess pressure relieved by pressure relief valve 722' and returned to first cylinder cavity 504 via a return path indicated by arrows 732.

It will be obvious to those having skill in the art that many changes may be made to the details of the above-described embodiments without departing from the underlying principles thereof. The scope of the present invention should, therefore, be determined only by the following claims.

The invention claimed is:

1. A turn brake system for an off-road vehicle of the type having a frame, a user-actuatable front wheel steering system including a steering rod, and a pair of rear wheels having independent left and right rear brakes, comprising:
   a fluid power cylinder assembly supported on the frame, the cylinder assembly including a first cylinder cavity operatively coupled to the left rear brake and a second cylinder cavity operatively coupled to the right rear brake; and
   a linkage mechanically coupling the steering rod to the cylinder assembly, the linkage transmitting force from the steering system to the cylinder assembly so that turning of the steering system in a first direction causes a first fluid power to be generated at the first cylinder cavity and turning of the steering system in a second direction opposite the first direction causes a second fluid power to be generated at the second cylinder cavity, the first and second fluid powers being transmitted to the respective left and right rear brakes to thereby apply differential braking force to the left and right rear wheels in response to actuation of the steering system.

2. A turn brake system in accordance with claim 1, further comprising a shutoff device for selectively disabling the turn brake system.

3. A turn brake system in accordance with claim 2, further comprising a first fluid passage extending from the first cylinder cavity to the left rear brake and a second fluid passage extending from the second cylinder cavity to the right rear brake, and in which the shutoff device includes a linking passage extending between the first and second fluid passages and a solenoid-actuated shutoff valve in the linking passage for selectively inhibiting fluid flow through the linking passage, the opening of the shutoff valve causing fluid pressure to be short-circuited to thereby disable the turn brake system.

4. A turn brake system in accordance with claim 2 in which the shutoff device includes, in the linkage, a selectively releasable coupling.

5. A turn brake system in accordance with claim 4 in which the selectively releasable coupling includes:
   a sleeve portion;
   a rod portion that extends within the sleeve portion; and
   a solenoid-actuated pin that is selectively extended to couple the sleeve portion to the rod portion and selectively retracted to decouple the sleeve and rod portions so that the rod portion slides freely within the sleeve portion to thereby decouple the cylinder assembly from the steering rod.

6. A turn brake system in accordance with claim 1 in which the first and second cylinder cavities of the cylinder assembly are located within a unitary cylinder housing and further comprising a piston assembly that moves within the cylinder housing for simultaneously expanding the first cylinder cavity and contracting the second cylinder cavity.

7. A turn brake system in accordance with claim 1, further comprising an adjusting mechanism for centering the cylinder assembly relative to the steering system.

8. A turn brake system in accordance with claim 7 in which the linkage has a length and the adjusting mechanism is part of the linkage, adjustment of the adjusting mechanism changing the length of the linkage.

9. A turn brake system in accordance with claim 1 in which:
the cylinder assembly includes a cylinder housing and a piston assembly positioned for movement within the cylinder housing; and
the piston assembly includes an adjusting nut for manually adjusting the position of the piston assembly relative to the cylinder housing to thereby center the cylinder assembly relative to the steering system.

10. A turn brake system in accordance with claim 1, further comprising a pressure relief valve for limiting the transmission to the respective left and right rear brakes of the first and second fluid powers.

11. A turn brake system in accordance with claim 1, further comprising at least one shuttle valve.

12. A turn brake system in accordance with claim 1 in which the linkage includes a rocker arm.

13. A turn brake system in accordance with claim 1 in which the vehicle includes a foot brake for generating a braking force, and the cylinder assembly cooperates with the foot brake of the vehicle to thereby allow the braking force of the foot brake to override the differential braking force of the turn brake system.

14. A turn brake system in accordance with claim 1 in which:
the cylinder assembly includes a cylinder housing and a piston assembly positioned for movement within the cylinder housing; and
one of the piston assembly and the cylinder housing is coupled to the frame and the other of the piston assembly and the cylinder housing is driven by the linkage, to thereby effect relative movement of the piston assembly and the cylinder housing in response to actuation of the steering system.

15. A turn brake system in accordance with claim 1, further comprising a pressure relief valve for limiting the application of the differential braking force to the respective left and right wheels.

16. A turn brake system for a vehicle including left and right wheels having corresponding left and right wheel brakes, and a front wheel steering system having a steering wheel, comprising:
a cylinder housing, including first and second cylinder cavities each having a volume for holding brake fluid;
a piston assembly operably coupled to the steering system and movable within the cylinder housing in response to turning of the steering wheel to change the volume of at least one of the first and second cylinder cavities;
a first shuttle valve in fluid communication with the first cylinder cavity and the left wheel brake for directing brake fluid from the first cylinder cavity to the left wheel brake; and
a second shuttle valve separate from the first shuttle valve, the second shuttle valve in fluid communication with the second cylinder cavity and the right wheel brake for directing brake fluid from the second cylinder cavity to the right wheel brake, thereby applying differential braking force to the left and right wheels in response to turning of the steering wheel.

17. A turn brake system in accordance with claim 16, further comprising a source of brake fluid for supplying brake fluid to the volumes of the first and second cylinder cavities.

18. A turn brake system in accordance with claim 16, further comprising a linkage mechanically coupling at least one of the piston assembly and the cylinder housing to the steering system.

19. A turn brake system in accordance with claim 18 in which the linkage includes a selectively releasable coupling for selectively disabling the turn brake system.

20. A turn brake system in accordance with claim 18 in which the linkage has a length and includes an adjusting mechanism for manually changing the length of the linkage to thereby center the turn brake system relative to the steering system.

21. A turn brake system in accordance with claim 16 in which the left and right wheel brakes include respective left and right rear wheel brakes.

22. A turn brake system in accordance with claim 16, further comprising a shutoff device for selectively disabling the turn brake system.

23. A turn brake system in accordance with claim 22, further comprising a first fluid passage extending from the first cylinder cavity to the left wheel brake and a second fluid passage extending from the second cylinder cavity to the right wheel brake, and in which the shutoff device includes a linking passage extending between the first and second fluid passages and a solenoid-actuated shutoff valve in the linking passage for selectively inhibiting fluid flow through the linking passage, the opening of the shutoff valve causing fluid pressure to be short-circuited to thereby disable the turn brake system.

24. A turn brake system in accordance with claim 16 in which the movement of the piston assembly within the cylinder housing simultaneously expands the volume of the first cylinder cavity and contracts the volume of the second cylinder cavity.

25. A turn brake system in accordance with claim 16 in which the piston assembly includes an adjusting mechanism for manually adjusting the position of the piston assembly relative to the cylinder housing to thereby center the turn brake system relative to the steering system.

26. A turn brake system in accordance with claim 16, further comprising a pressure relief valve for limiting the application of differential braking force to the respective left and right wheels.

27. A turn brake system in accordance with claim 16 in which the vehicle includes a foot brake for generating a braking force, and the turn brake system cooperates with the foot brake of the vehicle to thereby allow the braking force of the foot brake to override the differential braking force of the turn brake system.

28. A turn brake system for a vehicle including left and right wheels having corresponding left and right wheel brakes and a steering system having a steering wheel rotatable in response to an input torque, comprising:
a cylinder housing for holding brake fluid;
a piston assembly movable within the cylinder housing to generate fluid power via the brake fluid;
a means for moving the piston assembly relative to the cylinder housing in response to rotation of the steering wheel and for continuously converting a substantial portion of the input torque into fluid power; and means coupled to the cylinder housing for transmitting the fluid power to the left and right wheel brakes for selective activation of the left and right wheel brakes, to thereby apply differential braking force to the left and right wheels in response to turning of the steering wheel.

29. A turn brake system in accordance with claim 28 in which the means for moving the piston assembly relative to the cylinder housing includes a linkage that mechanically couples the steering system to one of the piston assembly and the cylinder housing.

30. A turn brake system in accordance with claim 28 in which the means for moving the piston assembly relative to the cylinder housing includes:
   a telemetry device for outputting a signal; and
   an actuator coupled to at least one of the cylinder housing and the piston assembly for applying a driving force thereto in response to the signal.

31. The turn brake system of claim 28, further comprising a means for selectively releasing brake fluid from the cylinder housing for transmission to at least one of the left and right wheel brakes via said means for transmitting fluid power.

32. The turn brake system of claim 31, in which the means for selectively releasing brake fluid includes a shuttle valve.

33. A turn brake system in accordance with claim 28, further comprising means for selectively disabling the turn brake system to temporarily halt the application of differential braking force in response to turning of the steering wheel.

34. A turn brake system in accordance with claim 33 in which the means for selectively disabling the turn brake system includes a solenoid-actuated shutoff valve.

35. A turn brake system in accordance with claim 33 in which the means for selectively disabling the turn brake system includes a selectively releasable coupling.

36. A turn brake system for a vehicle of the type including left and right ground-contacting wheels having respective left and right wheel brakes, a foot brake for simultaneously activating the left and right wheel brakes, and a front wheel steering system having a steering wheel, comprising:
   a cylinder housing including first and second cylinder cavities for holding brake fluid, the cylinder housing adapted to be interposed in fluid relation between the foot brake and the wheel brakes, the first cylinder cavity arranged in fluid communication with the left wheel brake and the second cylinder cavity arranged in fluid communication with the right wheel brake;
   a piston assembly movable within the cylinder housing, one of the piston assembly and the cylinder housing adapted to be coupled to the steering system for movement of the piston assembly relative to the cylinder housing in response to rotation of the steering wheel during a steering maneuver, the movement of the piston assembly selectively pressurizing the brake fluid in one of the first and second cylinder cavities to thereby apply a differential braking force to the first and second wheels for steering the vehicle; and
   a valve assembly in fluid communication with the first and second cylinder cavities and the foot brake, the valve assembly cooperating with the foot brake to allow the foot brake to override the turn brake system for activation of both of the left and right wheel brakes during a steering maneuver.

37. A turn brake system in accordance with claim 36, further comprising a shutoff device for selectively disabling the turn brake system.

38. A turn brake system in accordance with claim 37, further comprising a first fluid passage extending from the first cylinder cavity to the left wheel brake and a second fluid passage extending from the second cylinder cavity to the right wheel brake, and in which the shutoff device includes a linking passage extending between the first and second fluid passages and a solenoid-actuated shutoff valve in the linking passage for selectively inhibiting fluid flow through the linking passage, the opening of the shutoff valve causing fluid pressure to be short-circuited to thereby disable the turn brake system.

39. A turn brake system in accordance with claim 36 in which the left and right wheel brakes include respective left and right rear wheel brakes.

40. A turn brake system in accordance with claim 36 in which the left and right wheel brakes are operatively coupled to respective left and right front wheels of the vehicle.

41. A turn brake system in accordance with claim 36 in which the movement of the piston assembly within the cylinder housing simultaneously expands the first cylinder cavity and contracts the second cylinder cavity.

42. A turn brake system in accordance with claim 36, further comprising an adjusting mechanism for centering the turn brake system relative to the steering system.

43. A turn brake system in accordance with claim 36 in which the piston assembly includes an adjusting nut for manually adjusting the position of the piston assembly relative to the cylinder housing to thereby center the cylinder assembly relative to the steering system.

44. A turn brake system in accordance with claim 36, further comprising a pressure relief valve for limiting the application of the differential braking force to the respective left and right wheels.

45. A turn brake system in accordance with claim 36 in which the valve assembly includes at least one shuttle valve.

46. A turn brake system for a vehicle of the type including left and right ground-contacting wheels having respective left and right wheel brakes, and a front wheel steering system having a steering wheel, comprising:
   a cylinder housing including first and second cylinder cavities for holding brake fluid, the first cylinder cavity arranged in fluid communication with the left wheel brake and the second cylinder cavity arranged in fluid communication with the right wheel brake;
   a piston assembly movable within the cylinder housing, one of the piston assembly and the cylinder housing adapted for coupling to the steering system for movement of the piston assembly relative to the cylinder housing in response to rotation of the steering wheel during a steering maneuver, the movement of the piston assembly selectively pressurizing the brake fluid in one of the first and second cylinder cavities to thereby apply a differential braking force to the first and second wheels for steering the vehicle; and
   a user-activated shutoff device for selectively disabling the turn brake system to prevent application of the differential braking force to the first and second wheels.

47. A turn brake system in accordance with claim 46 in which the vehicle includes a foot brake for simultaneously activating the left and right wheel brakes, and further comprising a valve assembly in fluid communication with the first and second cylinder cavities and the foot brake, the valve assembly cooperating with the foot brake to allow the foot brake to override the turn brake system for activation of both of the left and right wheel brakes during a steering maneuver.

48. A turn brake system in accordance with claim 46, further comprising a first fluid passage extending from the first cylinder cavity to the left wheel brake and a second fluid passage extending from the second cylinder cavity to the right wheel brake, and in which the shutoff device includes a linking passage extending between the first and second fluid passages and a solenoid-actuated shutoff valve in the linking passage for selectively inhibiting fluid flow through the linking passage, the opening of the shutoff valve causing fluid pressure to be short-circuited to thereby disable the turn brake system.

49. A turn brake system in accordance with claim 46, further comprising an adjusting mechanism for centering the turn brake system relative to the steering system.

50. A turn brake system in accordance with claim 46, further comprising at least one shuttle valve.

* * * * *